June 19, 1928. 1,674,175
W. V. D. KELLEY
COLOR PHOTOGRAPHY
Filed Nov. 9, 1925
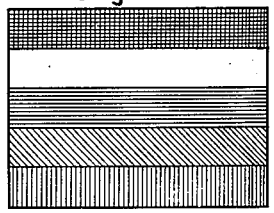
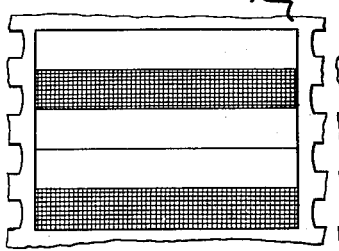
Red Negative
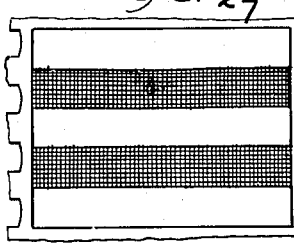
Green Negative
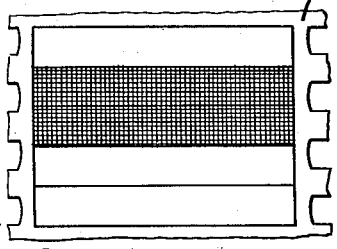
Blue Negative.
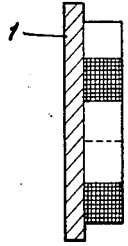
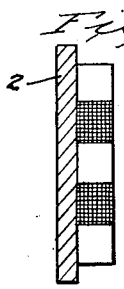
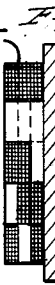
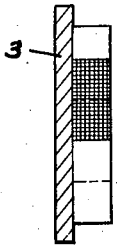
Positive
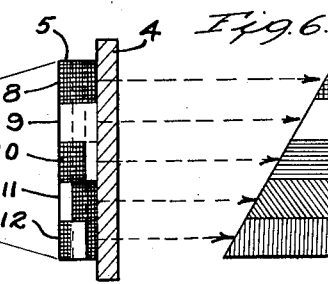
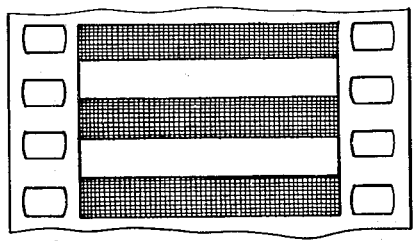
Green Printing Positive.
INVENTOR
William V. D. Kelley
BY Lyman E. Dodge
ATTORNEY Patented June 19, 1928.

1,674,175

UNITED STATES PATENT OFFICE.

WILLIAM V. D. KELLEY, OF JERSEY CITY, NEW JERSEY.

COLOR PHOTOGRAPHY.

Application filed November 9, 1925. Serial No. 67,735.

This invention relates to photography particularly to color photography and more especially to that form in which three colors are utilized.

The principal object of this invention is to furnish a process whereby three superimposed images of a single subject each of a different color may be produced in a single light sensitive coating on one side only of a carrier.

Other objects and advantages will appear as the description of a particular manipulation involving the novel features of applicant's invention progresses and the novel features will be particularly pointed out in the appended claims.

In describing the invention in detail and particular specific applications of the invention selected for the purpose of illustrating the principle of the invention reference will be had to the accompanying schematic drawings and the characters of reference thereon designating like parts in the several views, and in which:

Figure 1 is a schematic diagram illustrating a subject colored in the areas as shown; Fig. 2, is a red color selection negative of the subject Fig. 1; Fig. 3, is a green color selection negative of Fig. 1; Fig. 4, is a blue color selection negative of Fig. 1; Fig. 5, is a schematic diagram illustrating printing from the negative; Fig. 6, is a schematic diagram illustrating the effect of the finished product on transmitted light; Fig. 7, is a printing positive made from the green color selection negative Fig. 3; Fig. 8, is a cross sectional view of the negative Fig. 2; Fig. 9, is a cross sectional view of the negative Fig. 3; Fig. 10, is a cross sectional view of the negative Fig. 4.

To practice my process I must first secure color selection negatives of the subject Fig. 1. This may be done in any of the well known ways and as it is not part of the novelty of my process it needs no description. For my purposes I need a red color selection negative, Fig. 2 designated 1, a green color selection negative, Fig. 3 designated 2, and a blue color selection negative, Fig. 4 designated 3. If I should desire to work in other colors I would make selection accordingly.

I, first using the blue color selection negative Fig. 4, form a latent image in a light sensitive coating on a transparent carrier. In Fig. 5, I have represented a carrier or base 4, of transparent material, preferably celluloid. On this carrier is a coating, preferably of silver bromide gelatine emulsion, as usual, designated 5. In printing with the blue negative I place the negative and the positive stock back to back as shown in Fig. 5.

After exposure I develop. I preferably use a neutral or acid diamidophenol developing bath as follows:

| | |
|---|---|
| Diamidophenol | 5 grams |
| Sodium sulphite | 30 grams |
| Potassium bromide | 0.94 grams |
| Potassium iodide 10% solution | 1.2 c. c. s. |
| Water | 1 liter |

After washing, the positive is toned in a bath as follows:

| | |
|---|---|
| Vanadium oxalate, 10% sol. | 200 c. c. |
| Oxalic acid | 10 grams |
| Potassium ferricyanide | 10 grams |
| Water to make | 1 liter |

Fifteen minutes in this bath is followed by a thorough washing and then the positive is bathed for about ten minutes in the following bath:

| | |
|---|---|
| Ammonium bromide | 10 grams |
| Potassium bichromate | 10 grams |
| Water | 2 liters |

This bath which I call a clearing bath, so acts on the light sensitive salt in the emulsion that has been affected by the previous treatment that it cannot be again developed without exposure.

After washing, the positive is then dried.

I next using the red negative 1, form a latent image in the coating, by printing with the red negative coating in contact with the positive coating as shown in Fig. 5.

After printing, I develop as before, wash and tone by placing in a bath as follows:

| | |
|---|---|
| Oxalic acid | 5 grams |
| Ferric and ammonium oxalate | 14 grams |
| Potassium ferricyanide | 5 grams |
| Water | 1 liter |

The print should be allowed to remain in the blue color forming bath for about 15 minutes and then washed for about five minutes and then again placed in the clearing bath as before and then washed and dried.

I next form a latent image in the positive coating using the green negative designated 2. This time I also print with the coated side of the negative in contact with the coated side of the positive.

After printing, I develop as before wash and fix in sodium thiosulphate acidified with acetic acid and wash.

The positive now contains three images one in yellow, one in blue and one in black silver.

In order to color the black silver image I place the positive in a bath, for about 15 minutes, as follows:

| | |
|---|---|
| Chromic acid | 1 gram |
| Cupric sulphate | 40 grams |
| Potassium bromide | 32 grams |
| Water | 4 liters |

The above mentioned bath hardens the gelatine surrounding the silver grains and bleaches the silver so that it may be fixed out in the bath leaving clear gelatine that will absorb dyes. The dyes will wash out of the soft portions without degrading the intensity in the hardened portions thus giving me a magenta color for the third image if I use such a dye as azo rubine or acid magenta, both being of the acid family of dyes. This method of coloring is old and well known.

After the last coloring I have a positive which in cross section may be represented as shown in Fig. 6, with the colors as shown in the areas as shown.

If this positive is subjected to a source of white light 7 and the image thrown on a screen the result will be as shown in Fig. 6.

In the band 8, magenta is minus green, blue is minus red and yellow is minus blue, so that the entire light is cut off. In band 9, there is no coloring so that the transmitted light is white. In band 10, the magenta is minus green, blue is minus red and the transmitted light is the residue, blue. In band 11 the blue is minus red and the yellow is minus blue so that the residue green, is transmitted. In band 12 the magenta is minus green, the yellow minus blue and the red is transmitted.

It may be advantageous to form the last image by first making a printing positive from the green negative Fig. 3. This printing positive is illustrated by Fig. 7. When this is used as a negative a different process is used for coloring the image resulting. In this case the image is bleached as before but is dyed with dyes which will take on soft gelatine and hardly at all on the hardened portions. This also is a well known process and depends upon the time of bathing and strength and purity of the colors. Both basic and acid dyes may be used. The well known Pinatype dyes are also well suited to the purpose. The advantage of this last mentioned method lies in the fact that by its adoption the greatest use is made of the residual light sensitive material in the emulsion after two images have been imprinted.

From the above description it will be seen that the invention makes use of three coloring systems which are to some extent reversible. The yellow toning gives a vanadium salt image which will mordant basic dyes and if this image is colored with a dye for example red, then the third image may be colored with yellow acid dye. The second image should be toned with an iron salt toning bath that has no tendency to mordant or hold dyes or cause treated material to so act. The final result is that I have one image that does not mordant at all, one that mordants a basic dye and one that has an affinity for acid dyes.

The intermediate clearing bath which I use may be composed as hereinbefore stated, that is, of any suitable oxidizer and a suitable halide which acts to change the light sensitive salts, that have not been completely toned after an exposure to either vanadium or iron salt, into a halide of the light sensitive material or at least a condition in which the salts are not redevelopable in the developing solution without further exposure to light.

Although I have particularly described the construction and process of forming one physical embodiment of my invention and explained the operation and principle thereof and of my process used for the production thereof, nevertheless, I desire to have it understood that the form selected is merely illustrative but does not exhaust the possible physical embodiments of the idea of means underlying my invention or the extent of the applicability of my process.

What I claim as new and desire to secure by Letters Patent of the United States, is:

1. A color photograph consisting of three separately developed and colored silver images in one emulsion.

2. A photograph in a single emulsion having three colored silver records at different positions in the layer.

3. The method of making a three color photograph which consists in producing each color independently by successive printings in a light sensitive silver emulsion layer.

4. The method of making a three-color photograph which consists in superimposing three records by separate exposures and developments before fixing.

5. The process of making a color photograph which consists in making two exposures and developing and toning each as produced before fixing, then again exposing, developing and fixing and dye-toning.

6. A color photograph made of two toned pictures and one dye toned picture in a single layer of light sensitive emulsion.

7. A color photograph made of a vanadium salt an iron salt and a dye toned image.

8. A three exposure color photograph consisting of superimposed vanadium salt iron salt and dye toned images in one emulsion.

9. The method of making a three color photograph which consists in first forming one image in a layer of light sensitive emulsion, toning clearing and washing, then forming another image in the same layer, toning clearing and washing and then forming a third image in the same layer fixing and dye toning.

WILLIAM V. D. KELLEY.